July 13, 1965 C. GREEN ETAL 3,194,645
APPARATUS FOR FORMING MOLTEN GLASS IN CYLINDRICAL FORM
Filed July 31, 1961 3 Sheets-Sheet 1
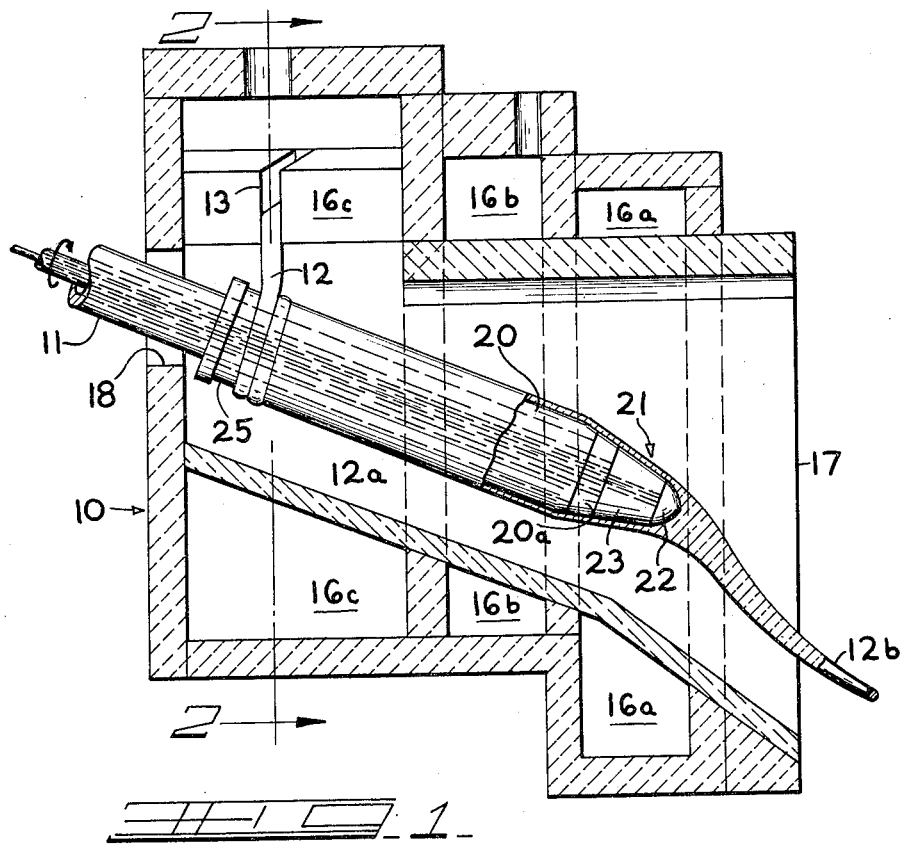
FIG. 1
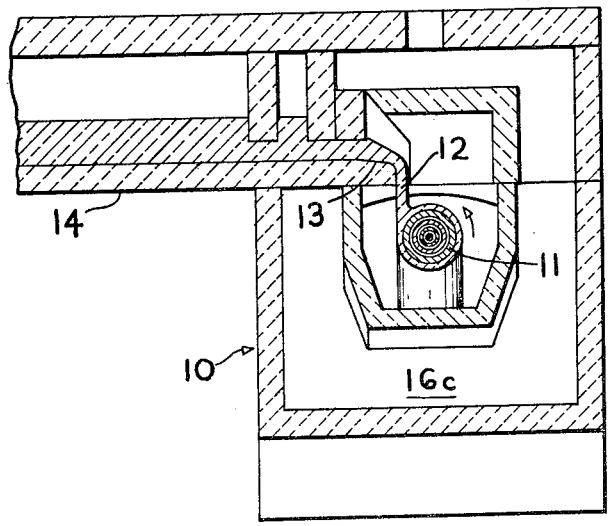
INVENTORS
CALVIN GREEN
JACK D WALK
BY W. A. Schaich &
E. J. Holler
ATTNYS July 13, 1965 C. GREEN ETAL 3,194,645
APPARATUS FOR FORMING MOLTEN GLASS IN CYLINDRICAL FORM
Filed July 31, 1961 3 Sheets-Sheet 2
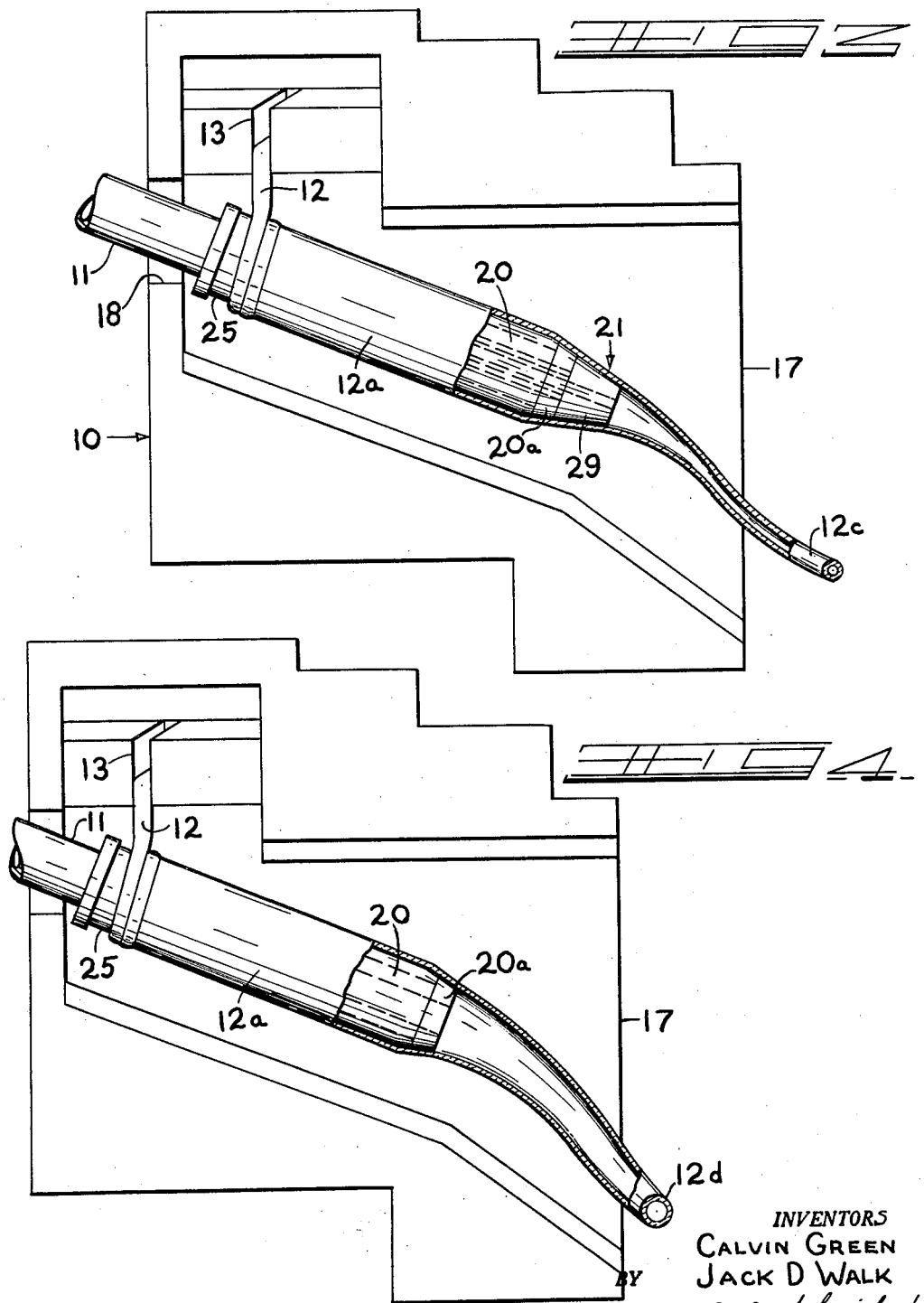
INVENTORS
CALVIN GREEN
JACK D WALK
W. A. Schaich &
E. J. Holler
ATTNYS July 13, 1965 C. GREEN ETAL 3,194,645
APPARATUS FOR FORMING MOLTEN GLASS IN CYLINDRICAL FORM
Filed July 31, 1961 3 Sheets-Sheet 3
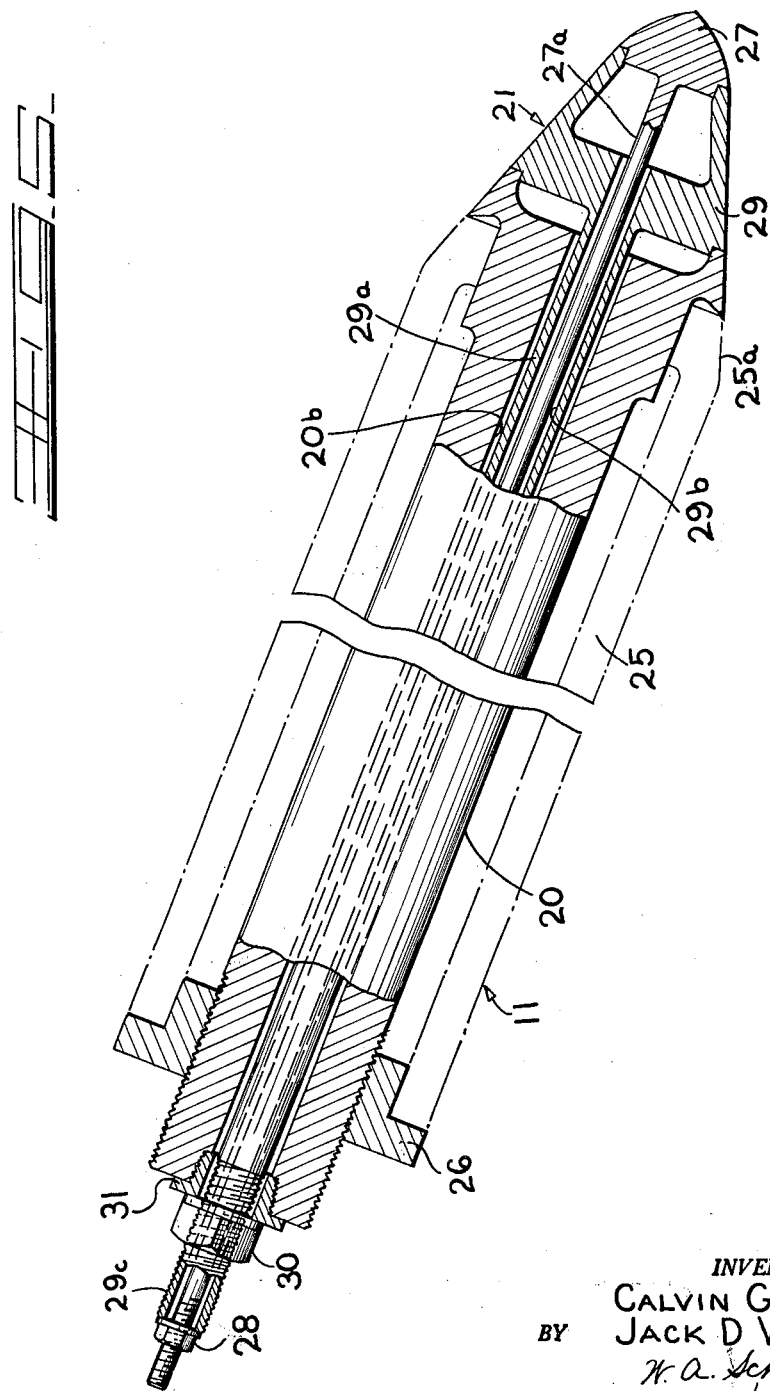
INVENTORS
CALVIN GREEN
BY JACK D WALK
W. A. Schaich &
E. J. Holle
ATTNYS

United States Patent Office 3,194,645
Patented July 13, 1965

3,194,645
APPARATUS FOR FORMING MOLTEN
GLASS IN CYLINDRICAL FORM
Calvin Green, Vineland, and Jack D. Walk, Millville,
N.J., assignors, by mesne assignments, to Owens-Illinois
Glass Company, Toledo, Ohio, a corporation of Ohio
Filed July 31, 1961, Ser. No. 128,204
4 Claims. (Cl. 65—167)

The present invention relates to improvements in both apparatus and method for continuously drawing glass or other thermoplastic material in cylindrical form, and more particularly to the provision of simple and efficient apparatus for practicing a novel process for continuously drawing molten material, such as glass, in lengthy cylindrical form either as solid rod, capillary tubing or regular tubing.

The present invention is especially adapted for use in conjunction with apparatus such as that disclosed in U.S. Patent No. 1,219,709 to Danner, issued March 20, 1917, entitled "Apparatus for Forming Molten Material in Cylindrical Form." In such apparatus a supply stream of molten glass flows onto a rotating inclined tapered mandrel and either cane or hollow tubing is continuously drawn from the lower end of the mandrel. The working portion of the mandrel as well as the supply stream and glass surrounding a major expanse of the mandrel are enclosed in a heated chamber or muffle.

Previously in the manufacture of glass rod or tubing in accordance with the Danner process, several different types of tips or nozzles are individually attached to the discharge end of the forming mandrel depending upon the particular product to be drawn. In the making of tubing, a nozzle having a perforated tip is employed as a blow pipe and in the making of rod or cane, the perforated tip is removed and an imperforate tip is substituted therefor which is conical in shape at its outer extremity. The body portion of the mandrel is adapted to receive either a perforate or imperforate tip member depending upon the particular type of product to be drawn therefrom. Thus various types of single-element discharge ends are interchangeable with the same body portion of the mandrel although a complete refractory sleeve change is frequently required which interchanging operation within the heated chamber is usually a difficult and time-consuming task. Normally a considerable period of time is required for the change-over operation and re-establishing proper thermally balanced conditions.

Accordingly, it is an object of the present invention to overcome the above-noted deficiencies in glass drawing operations by the provision of a forming mandrel having a discharge end comprised of a plurality of component parts which are readily separable into various forms for drawing a diversity of desired products.

Another object of this invention is the provision of simple and efficient means for drawing glass in cylindrical form in which the tapering discharge end of a rotary forming mandrel is readily disassembled stepwise into various configurations adapted to forming solid rod, capillary tubing and regular tubing, the latter having a lesser internal-external diameter ratio than capillary tubing.

Another object of this invention is the provision of novel apparatus for drawing molten glass into varied products having cylindrical contour by the utilization of a separable mandrel nosepiece which is readily converted to different discharge-end configurations for forming glass products such as rod, capillary tubing and regular tubing.

A further object of this invention is to provide both novel apparatus and method for continuously drawing molten glass in the form of lengthy rod or tubing having prescribed characteristics, said apparatus comprising a downwardly-inclined rotating mandrel having a discharge end portion comprised of a plurality of telescoping component parts separable into several stages for drawing different products.

A still further object of this invention is to provide an improved method of sequentially drawing a series of glass products all having lengthy cylindrical contours utilizing a unitary forming mandrel having a separable discharge end nosepiece capable of disassembly stepwise from its opposite non-working end.

The specific nature of this invention, as well as other objects and advantages thereof, will become apparent to those skilled in the art from the following detailed description, taken in conjunction with the annexed sheets of drawings on which, by way of preferred example only, are illustrated the preferred embodiments of this invention.

In the accompanying drawings:

FIG. 1 is a vertical sectional view illustrating a forming mandrel in one embodiment of the present invention incorporated in conventional glass drawing apparatus.

FIG. 2 is a vertical sectional view of reduced proportions taken along the line 2—2 of FIG. 1.

FIGS. 3 and 4 are side elevational views partly in vertical section illustrating the forming mandrel of the present invention in several other embodiments.

FIG. 5 is an enlarged vertical sectional view of the forming mandrel per se fabricated in accordance with the invention.

The present invention is particularly well adapted for use in connection with the apparatus of the above-identified patent to Danner and the attached drawings indicate a preferred form of novel apparatus incorporated therein to accomplish the purposes set forth above. It is to be understood that the invention is also applicable for use with other drawing processes and apparatuses wherein various diverse types of lengthy glass products are formed by drawing molten glass downwardly or upwardly from the discharge end of a stationary or rotating forming mandrel.

In accordance with FIG. 1 of the drawings, a muffle or chamber 10 encloses the usual downwardly-inclined rotating mandrel 11 upon the external surface of which molten glass flows, delivered thereonto in the form of a supply stream 12, from a delivery trough 13 positioned at the terminating end of a forehearth 14. The above-described elements can be varied widely as known in the art and may or may not be of relatively conventional structure.

Molten glass stream 12 is continuously deposited on rotating mandrel 11 and smoothly flows over its basically cylindrical surfaces initially in a helical and then cylindrical pattern and subsequently in a frusto-conical pattern. The glass is drawn in a constricting manner from the discharge end of mandrel 11 at prescribed rates into cylindrical form comprising rod or tube as set forth hereinbelow.

Forming chamber or muffle 10 which is normally either fabricated or lined with refractory material is surrounded by a plurality of annular heating chambers 16a, 16b, and 16c, which contain gas flames and/or products of combustion from burner fires to maintain uniform elevated temperatures within the chamber.

The discharge end 17 of the muffle from which the glass product is drawn may be generally open as shown or essentially fully enclosed except for a relatively small opening through which the glass product is drawn.

Mandrel 11 is mounted in downwardly-inclined relation projecting through an opening 18 in the muffle chamber. The mandrel is rotatingly mounted exteriorly of the chamber and driven at a uniform rate of rotation by various known types of conventional driving apparatus such as an electric motor and gear reduction box or the mechanism shown in the Danner patent.

Central blowpipe or body portion 20 of the mandrel which projects within the heated muffle chamber is surrounded by a lengthy cylindrical-shaped sleeve-like refractory member 25 having a short-length tapering lower extremity. The nose-piece 21 fabricated in accordance with the present invention consists of a solid tip member 22, a complemental frusto-conical shaped intermediate member 23, and a larger complemental frusto-conical shaped terminating area 20a of the mandrel body portion. Latter area 20a comprises one part of the mandrel body portion 20 and provides smoothly complemental frusto-conical surfaces at the discharge end.

As shown in FIG. 5, mandrel 11 consists essentially of body portion 20 which is essentially a metallic central shaft having an axial opening 20b extending throughout its length. Cylindrical refractory sleeve 25 having a short-length converging end portion 25a which is complemental to the terminating frusto-conical shaped extremity 20a of the mandrel body portion is mounted on the mandrel central shaft. The terminating end of the body portion thus provides short-length metallic forming surfaces 20a which in conjunction with an end cap 26 mounted on its opposite end serve to conjunctively retain refractory sleeve 25 in coaxial alignment therewith.

Mandrel nosepiece 21 consists of a solid tapering tip member 27 having imperforate surfaces which terminate in a rather blunt-nosed extremity. Tip member 27 has a lengthly rod-like extension 27a extending through the length of the mandrel with its opposite end being threaded to receive a locking nut 28. An intermediate member 29 having frusto-conical surfaces terminating in an axial opening serves to support tip member 27 in coaxial and concentric alignment with mandrel body portion 20. Intermediate member 29 has a hollow tubular extension 29a which extends through larger central opening 20b of the mandrel body portion. The other end of tubular extension 29a of the intermediate member 29 is threaded to receive a second locking nut 30 which is held in place against a bushing 31 fitted into the adjacent end of mandrel body portion 20. Lock washers of proper size are employed in conjunction with each of the locking nuts 28 and 30 to retain the component parts of the mandrel in rigidly-aligned relation. Each of the members 27 and 29 as well as the terminating exposed surfaces 20a of the mandrel body portion are formed with complemental shoulder and recessed areas to facilitate their positive engagement in locking relation and provide a smoothly uniform frusto-conical contour.

Operation of the subject apparatus in accordance with the present method may be described as follows:

With the mandrel 11 in fully-assembled condition, as shown in FIGS. 1 and 5, with solid imperforate tip member 27 comprising its discharge end extremity, the mandrel is placed in operation rotationally with supply stream 12 of molten glass deposited on an upper cylindrical portion of refractory sleeve 25. The glass flows downwardly onto and around the mandrel during its rotation as a workable cylindrical body 12a and is drawn lengthwise therefrom, as shown in FIG. 1, in the form of solid rod or cane 12b having a basically cylindrical configuration. As the solid glass product 12b is drawn, it assumes a catenary form and is then pulled lengthwise in a lineal path during its solidification as well known in the art. The campaign for forming rod is continued as long as desired with mandrel nosepiece 21 having the same configuration as shown in FIG. 1. Obviously, various sizes of rod are capable of being drawn therefrom based upon known variants such as the angle of inclination of the mandrel, glass temperatures, and atmospheric temperatures within the muffle chamber as well as drawing rates all being fully controlled.

At the completion of the rod drawing operation, lock nut 28 which retains the rod-like extension 27a of imperforate tip member 27 is removed and the tip member is withdrawn from the mandrel in the direction of chamber discharge end 17. Obviously during this interval the drawing of a usable product is disrupted, although the glass flow and ambient elevated temperatures within chamber 10 can be maintained within limits. If desired, the temperature of the glass on the mandrel can be raised to soften the glass into more readily workable condition to simplify the removal of tip member 27. During the removal of the tip member mandrel rotation can be continued at its normal relatively slow rate, if desired.

After removal of tip member 27 and opening of axial passage 29b within tubular extension 29a of intermediate member 29, a pressurized air or vacuum line and fitting consisting of a rotatable air or vacuum lock is affixed to terminating region 29c of such tubular extension. Nosepiece 21 having imperforate frusto-conical shaped surfaces and an axial opening is then ready to initiate drawing of capillary tubing. The glass emitting from intermediate member 29 is then threaded through the lineal passage of the drawing machine and thermally balanced conditions of the glass on the mandrel are readily re-established. Within a relatively short interval of time uniform capillary tubing 12c as shown in FIG. 3, is drawn from the mandrel. In drawing smaller sizes of capillary tubing such as a product having an internal diameter in the range of 0.1 mm. with an external diameter ranging from 4 to 5 millimeters, it is sometimes preferred that a vacuum be drawn internally of the product through axial opening 29b. During this phase of the operation utilizing frusto-conical-shaped nose member 29 various other sizes of capillary tubing can be drawn by prescribed adjustment of known variants as known in the art.

Following the campaign of drawing capillary tubing in the required sizes, retention nut 30 is removed from the externally-disposed cool end of tubular extension 29a and frusto-conical shaped intermediate member 29 is removed from the mandrel by withdrawing same in the direction of chamber discharge end 17. The terminating region of the mandrel then assumes the configuration shown in FIG. 4 wherein short-length frusto-conical surfaces of larger diameter of the mandrel body portion 20a provide a discharge end. At this time a larger blowpipe opening 20b is provided through mandrel body portion. A pressurized air line is then connected at the cool end of mandrel body portion 20 as by replacing bushing 31 with a fitting such as rotating-type air lock to provide blowing air to the mandrel. Regular tubing 12d having a lesser internal to external diameter ratio than existent in capillary tubing is then drawn from the larger terminating region of the mandrel as shown in FIG. 4. Drawing of various different sizes of conventional tubing can be continued as long as desired.

Thus, it is readily seen how the same refractory sleeve 25 of the mandrel is employed throughout the campaigns of drawing the various aforesaid types of glass products, i.e., solid rod, capillary tubing, and regular tubing. The downtime involved in converting the drawing mandrel from one configuration to another has been markedly shortened by as much as 90% in some cases. The prescribed mandrel nose-piece permits interchanging operations to be effected from the cool end of the mandrel essentially at ambient temperature without disrupting thermal conditions surrounding the mandrel forming area. Any slight disruption can again be properly balanced and precisely controlled within a brief period to continue drawing high-quality cylindrical glass products.

The glass contacting surfaces of nosepiece 21 such as the exterior surfaces of members 27, 29 and 20a are preferably fabricated of Nichrome metal to resist oxidation at elevated temperatures and provide essentially defect-free glass products. The remaining portions of these members such as rod-like extension 27a and tubular extension 29a of the tip end and frusto-conical-shaped intermediate members 29 are preferably fabricated of stainless steel to resist oxidation and be long-lived within the elevated temperature zone of the muffle chamber.

Various modifications may be resorted to within the spirit and scope of the appended claims.

We claim:

1. A rotatable mandrel for forming molten glass in cylindrical form comprising a cylindrically-shaped body portion and an interconnecting conically-shaped free end portion, said free end portion being comprised of multiple complementally-contoured separable component parts, the terminating part being conically-shaped and the next adjacent part being frusto-conically shaped, means connecting each of said component parts to said body portion extending through the latter, said parts being adapted for use both in cooperation and in succession for forming individual rod and tubular products by drawing.

2. A rotatable mandrel for forming molten glass in cylindrical form comprising a cylindrically-shaped body portion and an interconnecting conically-shaped free end portion, said free end portion being comprised of multiple complementally-contoured separatable component parts, the terminating part being frusto-conically-shaped and the next adjacent part terminating in a frusto-conically-shaped portion, means connecting the next adjacent of said component parts to said body portion, and means extending through the body portion releasably connecting said terminating part to said next adjacent part and said body portion, said parts being adapted for use both in cooperation and in succession for forming individual tubular products by drawing.

3. A rotatable mandrel for forming molten glass in cylindrical form comprising a cylindrically shaped body portion and an interconnecting free end portion of a gradually diminishing diameter towards its discharge end, said free end portion being comprised of multiple complementally-contoured separatable component parts, the part closest to the body portion terminating in a frusto-conically-shaped portion, means for connecting said part closest to the body portion to the body portion, and means extending through the body portion releasably connecting the terminating part of said component parts to said body portion and to the other of said component parts, said parts being adapted for use both in cooperation and in succession for forming individual tubular products by drawing.

4. A mandrel as defined in claim 1 wherein said terminating part has an imperforate external surface.

References Cited by the Examiner
UNITED STATES PATENTS

| | | | |
|---|---|---|---|
| 1,219,709 | 3/17 | Danner | 65—187 X |
| 1,635,439 | 7/27 | Schram | 65—362 |
| 1,655,924 | 1/28 | Truelove et al. | 65—375 |
| 1,843,175 | 2/32 | Sears | 65—362 |

DONALL H. SYLVESTER, *Primary Examiner*.